(12) United States Patent
Dutt et al.

(10) Patent No.: US 11,934,398 B2
(45) Date of Patent: Mar. 19, 2024

(54) USING QUERY LOGS TO OPTIMIZE EXECUTION OF PARAMETRIC QUERIES

(71) Applicant: Microsoft Technology Licensing, LLC, Redmond, WA (US)

(72) Inventors: Anshuman Dutt, Sammamish, WA (US); Kapil Eknath Vaidya, Cambridge, WA (US); Vivek Ravindranath Narasayya, Redmond, WA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 17/361,016

(22) Filed: Jun. 28, 2021

(65) Prior Publication Data

US 2022/0414099 A1   Dec. 29, 2022

(51) Int. Cl.
*G06F 16/245* (2019.01)
*G06F 11/34* (2006.01)
*G06F 16/2453* (2019.01)
*G06N 20/00* (2019.01)

(52) U.S. Cl.
CPC .... *G06F 16/24545* (2019.01); *G06F 11/3409* (2013.01); *G06F 16/24539* (2019.01); *G06N 20/00* (2019.01)

(58) Field of Classification Search
CPC ......... G06F 16/24545; G06F 16/24539; G06F 11/3409; G06N 20/00
See application file for complete search history.

(56) References Cited

U.S. PATENT DOCUMENTS

| | | | |
|---|---|---|---|
| 7,289,978 B2* | 10/2007 | Limoges | G06F 16/2433 707/999.002 |
| 2006/0230013 A1* | 10/2006 | Hrle | G06F 16/24557 |
| 2007/0299814 A1* | 12/2007 | Barsness | G06F 16/2453 |
| 2008/0195577 A1* | 8/2008 | Fan | G06F 16/24545 |
| 2008/0222093 A1 | 9/2008 | Fan et al. | |
| 2015/0227585 A1* | 8/2015 | Braham | G06F 16/24545 707/718 |

(Continued)

OTHER PUBLICATIONS

"International Search Report and Written Opinion Issued in PCT Application No. PCT/US22/035303", dated Oct. 7, 2022, 12 Pages.

(Continued)

*Primary Examiner* — Son T Hoang
(74) *Attorney, Agent, or Firm* — Ray Quinney & Nebeker; James Bullough

(57) ABSTRACT

The present disclosure relates to systems, methods, and computer-readable media for optimizing selection of a cached execution plan to use in processing a parametric query. For example, systems described herein involve training a plan selection model that makes use of machine learning to identify an execution plan from a set of pre-selected execution plans based on predicted cost of executing a query instance in accordance with the selected execution plan (e.g., relative to predicted costs of executing the query instance using other pre-selected execution plans). This application describes features related to lowering costs associated with selecting the execution plan in a way that will continue to be more accurate overtime based on training and refining the plan selection model.

20 Claims, 7 Drawing Sheets

(56) References Cited

U.S. PATENT DOCUMENTS

| | | | |
|---|---|---|---|
| 2021/0133193 A1* | 5/2021 | McConnell | G06F 16/24542 |
| 2022/0121633 A1* | 4/2022 | Quader | G06F 16/213 |

OTHER PUBLICATIONS

Stoyanovich, et al., "ReoptSMART: A Learning Query Plan Cache", In the Technical Report cucs-023-08, Columbia University, Apr. 26, 2011, 33 Pages.

"SQL Server, Query Store Object", Retrieved from: https://docs.microsoft.com/en-us/sql/relational-databases/performance-monitor/sql-server-query-store-object?view=sql-server-ver15, Mar. 17, 2016, 3 Pages.

"TPC-DS Version 2 and Version 3", Retrieved from: https://web.archive.org/web/20210427092935/http://www.tpc.org/tpcds/, Apr. 27, 2021, 2 Pages.

"TPC-H Vesion 2 and Version 3", Retrieved from: https://web.archive.org/web/20210415131313/http://tpc.org/tpch/, Apr. 15, 2021, 2 Pages.

Aluc, et al., "Parametric Plan Caching Using Density-Based Clustering", In Proceedings of IEEE 28th International conference on Data Engineering, Apr. 1, 2012, 12 Pages.

Assaf, et al., "Plan Guides", Retrieved from: https://docs.microsoft.com/en-us/sql/relational-databases/performance/plan-guides?view=sql-server-ver15, Mar. 14, 2017, 7 Pages.

Assaf, et al., "SQL Server, Plan Cache Object", Retrieved from: https://docs.microsoft.com/en-us/sql/relational-databases/performance-monitor/sql-server-plan-cache-object?view=sql-server-ver15, Mar. 14, 2017, 3 Pages.

Bizarro, et al., "Progressive Parametric Query Optimization", In Proceedings of IEEE Transactions on Knowledge and Data Engineering, vol. 21, Issue 4, Apr. 2009, pp. 582-594.

Chapelle, et al., "An Empirical Evaluation of Thompson Sampling", In Proceedings of Advances in Neural Information Processing Systems 24, Dec. 12, 2011, 9 Pages.

Chaudhuri, Surajit, "Query Optimizers: Time to Rethink the Contract?", In Proceedings of the ACM SIGMOD International Conference on Management of data, Jun. 29, 2009, pp. 961-968.

Chaudhuri, et al., "Variance aware optimization of parameterized queries", In Proceedings of the ACM SIGMOD International Conference on Management of data, Jun. 6, 2010, pp. 531-542.

Chen, et al., "XGBoost: A Scalable Tree Boosting System", In Proceedings of the 22nd ACM SIGKDD International Conference on Knowledge Discovery and Data Mining, Aug. 2016, pp. 785-794.

Chu, et al., "Least expected cost query optimization: An exercise in utility", In Proceedings of the eighteenth ACM SIGMOD-SIGACT-SIGART symposium on Principles of database systems, May 1999, pp. 138-147.

Chu, et al., "Least Expected Cost Query Optimization: What Can We Expect?", In Proceedings of the twenty-first ACM SIGMOD-SIGACT-SIGART symposium on Principles of database systems, Jun. 3, 2002, 10 Pages.

Cole, et al., "Optimization of Dynamic Query Evaluation Plans", In Proceedings of the ACM SIGMOD international conference on Management of data, May 24, 1994, pp. 150-160.

Cortes, David, "Adapting multi-armed bandits policies to contextual bandits scenarios", In Journal of Computing Research Repository, Nov. 2018, pp. 1-29.

Dey, et al., "Efficiently Approximating Query Optimizer Plan Diagrams", In Journal of the VLDB Endowment, vol. 1, Issue 2,, Aug. 24, 2008, 12 Pages.

Dutt, et al., "Efficiently approximating selectivity functions using low overhead regression models", In Proceedings of the VLDB Endowment, vol. 13, Issue 12, Jul. 1, 2020, pp. 2215-2228.

Dutt, et al., "Leveraging re-costing for online optimization of parameterized queries with guarantees", In Proceedings of the ACM International Conference on Management of Data, May 9, 2017, pp. 1539-1554.

Dutt, et al., "Selectivity Estimation for Range Predicates Using Lightweight Models", In Proceedings of the VLDB Endowment, vol. 12, Issue 9, May 1, 2019, pp. 1044-1057.

Ganguly, Sumit, "Design and Analysis of Parametric Query Optimization Algorithms", In Proceedings of the 24th International Conference on Very Large Data Bases, Aug. 24, 1998, pp. 228-238.

Ghazal, et al., "Dynamic plan generation for parameterized queries", In Proceedings of the ACM SIGMOD International Conference on Management of data, Jun. 29, 2009, pp. 909-916.

Graefe, et al., "Dynamic Query Evaluation Plans", In Proceedings of the ACM SIGMOD International Conference on Management of Data, Jun. 1989, 9 Pages.

Harish, et al., "On the Production of Anorexic Plan Diagrams", In Proceedings of the 33rd international conference on Very large data bases, Sep. 23, 2007, pp. 1081-1092.

Hulgeri, et al., "Parametric query optimization for linear and piecewise linear cost functions", In Proceedings of the 28th international conference on Very Large Data Bases, Aug. 20, 2002, 12 Pages.

Ioannidis, et al., "Parametric query optimization", In International Journal on Very Large Data Bases, vol. 6, Issue 2, May 1997, pp. 132-151.

Lan, et al., "A survey on advancing the dbms query optimizer: Cardinality estimation, cost model, and plan enumeration", In Journal of Data Science and Engineering, Jan. 15, 2021, pp. 86-101.

Lee, et al., "Closing the query processing loop in Oracle 11g", In Journal of the VLDB Endowment, vol. 1, Issue 2, Aug. 23, 2008, pp. 1368-1378.

Leis, et al., "Query optimization through the looking glass, and what we found running the join order benchmark", In the VLDB Journal, vol. 27, Issue 5, Sep. 18, 2017, pp. 643-668.

Lopes, et al., "Hints (Transact-SQL)—Query", Retrieved from: https://docs.microsoft.com/en-us/sql/t-sql/queries/hints-transact-sql-query?view=sql-server-ver15, Jun. 9, 2021, 23 Pages.

Marcus, et al., "Bao: Learning to Steer Query Optimizers", In Repository of arXiv:2004.03814v1, Apr. 8, 2020, pp. 1-16.

Marcus, et al., "Neo: A Learned Query Optimizer", In Proceedings of the VLDB Endowment, vol. 12, No. 11, Jul. 2019, pp. 1-18.

Rabanser, et al., "Failing loudly: An empirical study of methods for detecting dataset shift", In Journal of Computing Research Repository, Oct. 2018, pp. 1-38.

Reddy, et al., "Analyzing plan diagrams of database query optimizers", In Proceedings of the 31st conference on Very large data bases, Aug. 30, 2005, 13 Pages.

Roth, et al., "Extended events overview", Retrieved from: https://docs.microsoft.com/en-us/sql/relational-databases/extended-events/extended-events?view=sql-server-ver15, Jul. 23, 2019, 7 Pages.

Sen, et al., "Contextual bandits with stochastic experts", In Proceedings of the Twenty-First International Conference on Artificial Intelligence and Statistics, Mar. 31, 2018, 10 Pages.

Sudarshan, et al., "Anipqo: almost non-intrusive parametric query optimization for nonlinear cost functions", In Proceedings of the 29th international conference on Very large data bases—vol. 29, Sep. 9, 2003, 12 Pages.

Vermorel, et al., "Multi-armed bandit algorithms and empirical evaluation.", In Proceedings of European conference on machine learning, Oct. 3, 2005, pp. 437-448.

Zhang, et al., "Warm-starting contextual bandits: Robustly combining supervised and bandit feedbackback", In Proceedings of the 36th International Conference on Machine Learning, Jan. 2, 2019, 10 Pages.

Zhou, et al., "A survey on contextual multi-armed bandits", In Journal of Computing Research Repository, Aug. 2015, pp. 1-37.

Zhou, et al., "On multi-class cost-sensitive learning", In Proceedings of the Twenty-First National Conference on Artificial Intelligence, Jul. 16, 2006, pp. 567-572.

\* cited by examiner

USING QUERY LOGS TO OPTIMIZE EXECUTION OF PARAMETRIC QUERIES

BACKGROUND

Recent years have seen a significant rise in the use of computing devices to create, store, and process data. Indeed, tools and applications for maintaining and querying datasets of database systems are becoming more and more common. As databases become larger and more complex, conventional tools and techniques for querying databases have become inefficient and increasingly expensive.

One way that conventional query processing systems have increased efficiency with which queries are processed is by generating or selecting optimized execution plans for a query. In some cases, this is performed by generating an execution plan for implementing operators of a query in a way that obtains relevant and correct data from a database in as efficient a manner as possible. While generating customized plans can result in lower costs in executing a given query, the act of generating the execution plan(s) can also be very expensive and result in a high processing cost prior to carrying out the execution plan. Where a system receives a high quantity of queries on a daily basis, generating a customized execution plan for each incoming query can become cost-prohibitive, particularly where processing resources are limited or where scaling resources to meet demand can become expensive.

As an alternative to generating a customized execution plan for each incoming query, some query processing systems minimize cost associated with customized execution plans by identifying an execution plan (e.g., from a set of plans) that is known to work well for a large cross-section of queries. While storing one or more execution plans to use for all incoming queries may decrease costs associated with generating the execution plans themselves, this also introduces inefficiencies and processing costs in connection with processing the queries themselves. For example, a cached execution plan may provide optimal performance for some queries, but provides suboptimal performance for other queries.

These and other problems exist in connection with optimizing and executing queries, and particularly parametric queries.

DETAILED DESCRIPTION

Figure 1:
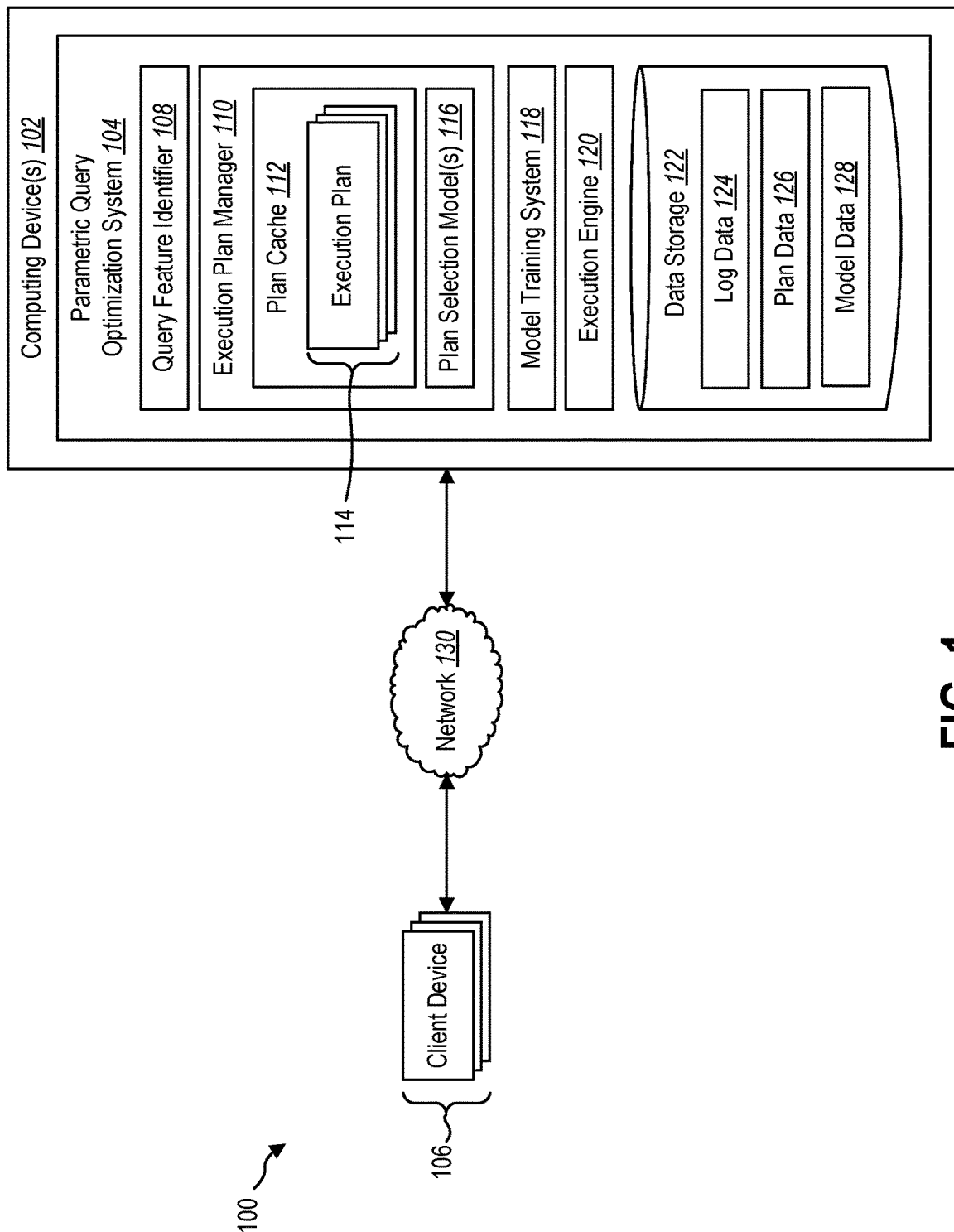
FIG. 1 illustrates an example environment including a parametric query optimization system in accordance with one or more embodiments.

This disclosure relates to a parametric query optimization system for optimizing selection of an execution plan for processing incoming queries. In particular, features and functionality described herein relate to training a plan selection model to accurately predict which execution plan from a cache of pre-selected execution plans would be the best execution plan for optimizing execution performance of a parametric query. As will be discussed in further detail below, features and functionality of the parametric query optimization system utilize machine learning to train and refine a plan selection model to identify an execution plan predicted to have a low cost when executing a parametric query based on features (e.g., selectivities) of parameterized predicates (or simply "predicates") that make up an instance of the parametric query. As will be discussed below, features and functionalities of the parametric query optimization system can lower costs associated with processing queries by multiple orders of magnitude and in a way that costs will continue to decrease over time relative to conventional query optimizers.

As an illustrative example, a parametric query optimization system may receive a query (e.g., a parametric query) including a plurality of predicates (e.g., parameterized predicates) for fields of a parametric query template. The parametric query optimization system may determine various features of the predicates, such as selectivities of the predicates indicating a frequency with which entries (e.g., rows, columns) of a relational database satisfy each of the predicates. The parametric query optimization system may additionally apply a plan selection model to the predicates to determine which execution plan from a cache of execution plans would be the best of the available execution plans to use in executing the query. The parametric query optimization system may additionally provide the query and associated execution plan to an execution engine for processing in accordance with the selected execution plan.

The present disclosure provides a number of practical applications that provide benefits and/or solve problems associated with optimizing selection of an execution plan for processing incoming queries. Examples of some of these practical applications and benefits will be discussed in further detail below.

For example, features and functionalities provided by the parametric query optimization system can lower costs associated with selecting execution plans while still selecting the best available plan. For instance, by training a plan selection model based on information from a query log, the parametric query optimization system can more accurately identify a best execution plan from a plan cache than a conventional system in which an execution is selected based on a simple or static algorithm and/or based on assumptions about how a query optimizer works that may not always be accurate. This learning process provides a notable improvement over conventional selection of execution plans by considering trends of an actual workload for the parametric query template.

In addition, by using machine learning technology in connection with training and implementing the plan selection model, the parametric query optimization system can consider a wide variety of features in determining the best execution plan for a given query instance. For example, one or more embodiments described herein involve considering selectivities of various predicates in combination with values of the predicates themselves and any other factor(s) or characteristics of the predicates that may be used to identify an execution plan. Using machine learning technology additionally enables the parametric query optimization system to consider some predicate features (e.g., query features) more heavily than other features in selecting an execution plan. For example, in one or more embodiments, the parametric query optimization system considers a subset of predicates or predicate features (e.g., selectivities) that are most determinative of the best execution plan while discarding or otherwise discounting other predicates when identifying an execution plan to provide to an execution engine.

In one or more embodiments described herein, the parametric query optimization system may consider a combination of costs in determining a predicted cost of executing a given query. For example, where an optimization engine or query optimizer may calculate estimated costs that are used in determining or optimizing an execution plan, one or more embodiments described herein may further involve considering an execution cost as tracked by an execution engine. In particular, as will be discussed in further detail below, a plan selection model may be refined by considering execution costs as feedback in refining the plan selection model. In this way the models described herein can consider a combination of both estimated costs determined by an optimizer and execution costs tracked by an execution engine over time in selecting execution plans.

In one or more embodiments, the parametric query optimization system may additionally decrease costs associated with selecting an execution plan by training a plan selection model to identify an execution plan from a plan cache without invoking a query optimizer for each input query instance. For example, as will be discussed in further detail below, while a query optimizer may be used to estimate costs associated with executing a query instance and further training the plan selection model based at least in part on the estimated costs, once trained, the plan section model may facilitate selection of an execution plan without invoking an expensive call to an optimizer. This can reduce average overhead of the parametric query optimization system, particularly in connection with selecting an execution plan.

As illustrated in the foregoing discussion, the present disclosure utilizes a variety of terms to describe features and advantages of one or more embodiments of the query optimization system described herein. For example, as used herein, a "dataset" may refer to a set of data or a subset of data from a database including multiple datasets. For example, as used herein, a dataset may refer to a set of tables or relations of a database (e.g., a relational database). Indeed, a dataset may refer to any collection of data that may be accessed and processed in response to receiving a query. In one or more embodiments, the dataset(s) or database refers to data that is stored in tables in a relational manner (e.g., columns, rows).

As used herein, a "query" may refer to a request or command(s) including operators for obtaining and/or processing data from one or more datasets. In one or more embodiments described herein, a query specifically refers to a parametric query. As used herein, a "parametric query" refers to a query having a particular form or structure that make up a parametric query template. The template may include predicates with predicate markers and fields within which values may be entered. These fields may refer to parameterized predicates (or simply "predicates"), which may refer to a condition or an attribute associated with a parameter marker within the parameterized template. Specific values of the parameter marker may refer to a binding. In one or more embodiments described herein, a parametric query template may refer to a structured query language (SQL) statement that may be executed repeatedly with different parameter bindings.

In one or more embodiments described herein, a predicate may include one or more predicate features. For example, a feature of a predicate (referred to herein as a "predicate feature" or "query feature") may refer to a specific value of a predicate, a value type, or other quantifiable or detectable characteristic of the predicate(s). In one or more embodiments described herein, a predicate feature or query feature refers specifically to a selectivity with respect to corresponding dataset(s) (e.g., a table) of a relational database. As used herein, a selectivity may refer to a metric of frequency that a value, row, or other component of a dataset satisfies a given predicate. In one or more embodiments, a selectivity refers to a ratio, fraction, or percentage (e.g., a number between 0 and 1) of rows within a table or other dataset that satisfies an associated predicate. In one or more embodiments, multiple predicates may be associated with respective selectivities.

As used herein, an "execution plan" refers to any data indicating information or instructions associated with how an execution engine may execute a given query. For example, an execution plan may refer to an action plan corresponding to a structure or hierarchy of operators from a query that may be executed with respect to one or more datasets. The execution plan may have a format or language that is usable by an execution engine to execute or otherwise process a given query.

As used herein, a "plan cache," "cache of execution plans," or "cached execution plans" may refer interchangeably to a set of execution plans that have been pre-selected for one or more types or class of queries. In one or more embodiments described herein, a set of cached execution plans are pre-selected for any queries that are generated using a parametric query template. Any number of factors may be used in determining a cache of execution plans. One or more embodiments described herein relate specifically to selecting a best execution plan from a set of cached execution plans using a plan selection model having been trained to select a best execution plan from a set of cached execution plans based on predicates of a given query.

Additional detail will now be provided regarding a parametric query optimization system in connection examples illustrated in the figures. For example, FIG. 1 illustrates an example environment 100 including one or more computing device(s) 102 and one or more client devices 106. As shown in FIG. 1, the computing device(s) 102 includes a parametric query optimization system 104. The parametric query optimization system 104 may include a number of components, which will be discussed in further detail below.

As shown in FIG. 1, the computing device(s) 102 and the client devices 106 may communicate with each other directly or indirectly through a network 130. The network 130 may include one or multiple networks and may use one or more communication platforms or technologies for transmitting data. The network 130 may refer to any data link that enables transport of electronic data between devices and/or modules of the example environment 100 shown in FIG. 1. The network 130 may refer to a hardwired network (e.g., where a client accesses the database management system directly), a wireless network (e.g., where the client devices communicate with the server device(s) over a wireless network), or a combination of hardwired and wireless networks. In one or more embodiments, the network includes the Internet.

The client devices 106 and the computing device(s) 102 may refer to various types of computing devices. As an example, one or more of the client devices 106 may include a mobile device, such as a mobile telephone, a smartphone, a PDA, a tablet, or a laptop. One or more of the client devices 106 may also include non-mobile devices such as a desktop computer, server device, or other non-portable device(s). The computing device(s) 102 may similarly refer to different types of computing devices similar to the client devices 106. In one or more embodiments described herein, the computing device(s) 102 refers to server devices of a cloud computing system with the client devices 106 referring to a wide variety of devices capable of accessing the cloud computing system via the network 130. Each of the computing device(s) 102 and client devices 106 may include any of the features and functionalities described below in connection with FIG. 7.

Additional detail will now be provided regarding a parametric query optimization system 104. It will be understood that features and functionality described in connection with a specific example or embodiment may similarly apply to other embodiments. Accordingly, while various examples are discussed herein in connection with specific implementations, features described in connection with these examples may apply to other embodiments of the parametric query optimization system 104. In addition, while FIG. 1 illustrates an example in which the parametric query optimization system 104 is implemented within a single computing device 102, one or more of the components may be implemented across multiple computing devices, such as multiple network devices of a cloud computing system or, in some cases across a combination of server devices and the client devices 106 shown in the example environment 100 of FIG. 1.

As shown in FIG. 1, the parametric query optimization system 104 may include a query feature identifier 108. As will be discussed in further detail below, upon receiving a parametric query, the query feature identifier 108 may identify any number of characteristics or features of the parametric query. In particular, in one or more embodiments, the query feature identifier 108 may identify one or more query features for each predicate from a plurality of predicates that are included within the parametric query. As mentioned above, the query feature identifier 108 may identify a wide variety of features such value-types (e.g., numeric, textual), specific values of the predicates (e.g., numeric values, classifications), or any other observable characteristic of the predicate(s).

In one or more embodiments, the query feature identifier 108 specifically identifies a selectivity metric (or simply a "selectivity") for the predicates of a received parametric query. As indicated above, a selectivity for a predicate may indicate a metric associated with a frequency or likelihood that the predicate is satisfied within a dataset. In one or more embodiments described herein, a selectivity refers to a quantity (e.g., a number, a percentage, a ratio) of rows for a dataset that satisfy the predicate. Thus, in one or more embodiments, the query feature identifier 108 may identify a selectivity for each predicate of a number of predicates.

As shown in FIG. 1, the parametric query optimization system 104 additionally includes an execution plan manager 110. As will be discussed in further detail below, the execution plan manager 110 may manage selection of an execution plan for use in executing a parametric query. For example, in one or more embodiments, the execution plan manager 110 may generate and/or maintain a plan cache 112 including a plurality of execution plans 114. As noted above, the execution plans 114 may refer to a set of pre-selected plans that are specific to a parametric query template.

The plan cache 112 may include any number of execution plans 114. In one or more embodiments, the plan cache 112 includes a fixed number of execution plans 114 for a corresponding parametric query template. In one or more embodiments, the execution plan manager 110 identifies additional or fewer execution plans 114 depending on a complexity of the query template and/or a variety of outputs that may be generated based on a nature of the parametric queries for the associated query template. For example, the plan cache 112 may include fewer execution plans 114 for a less complex query template (e.g., a query template for which queries may be executed at low cost using a smaller sample of execution plans) or, alternatively, additional execution plans 114 for a more complex query template (e.g., a query template for which queries may need a wider variety of execution plans to be executed).

In addition to managing creation and management of the plan cache 112, the execution plan manager 110 may include one or more plan selection model(s) 116 trained to identify an execution plan from the plan cache 112. In particular, as will be discussed in further detail below, a plan selection model 116 may be trained to identify an execution plan from the plan cache 112 that is predicted to have a lowest predicted cost when used as an action plan for executing a given parametric query. As will be discussed below, the plan selection model 116 may be trained to consider a set of predicates (e.g., query features of the set of predicates) for a given parametric query to determine which of the plurality of execution plans 114 would result in the most efficient execution of the parametric query from the plan cache 112.

In one or more embodiments, the plan selection model 116 may utilize one or more machine learning models trained to identify or predict a most efficient (e.g., a lowest cost) execution plan from the plan cache 112. The plan selection may utilize a wide variety of different machine learning models. As used herein, a "machine learning model" may refer to a computer algorithm or model (e.g., a classification model, a regression model, etc.) that can be tuned (e.g., trained) based on training input to approximate unknown functions. For example, a machine learning model may refer to a decision tree, such as a classification tree or regression tree. As another example, a machine learning model may refer to one of a variety of types of neural networks or other machine learning algorithm(s). Indeed, as used herein, a machine learning model may refer to any machine learning algorithm(s) or architecture that learns and approximates functions and generates outputs based on one or more inputs provides to the machine learning model.

As shown in FIG. 1, the parametric query optimization system 104 includes or otherwise makes use of a model training system 118. In one or more embodiments, the model training system 118 facilitates training of the plan selection model 116. As will be discussed below, the model training system 118 may train the plan selection model 116 based on a query log in which a query optimizer estimates execution costs for a plurality of parametric queries. In particular, the plan selection model 116 may be trained based on features derived on the predicates of the queries and associated estimated costs or best plan label(s) determined by the query optimizer. These estimates may serve as ground truths that enable the plan selection model 116 to predict an execution cost associated with a given set of predicates. In one or more embodiments described herein, the model training system 118 can train the plan selection model 116 offline.

The query optimizer may refer to any of a variety of optimization engines being configured to estimate a cost associated with executing a query in accordance with an execution plan. For example, a query optimizer may refer to an optimization engine that is capable of systematically analyzing impacts associated with applying a variety of operators and conditions to a parametric query. In this example, the query optimizer may be configured to estimate a cost associated with executing a parametric query using any of the plurality of execution plans 114. As will be discussed below, the model training system 118 may use the determined cost(s) for the execution plans 114 of the plan cache 112 to identify which of the execution plans 114 would be best for a given parametric query and train the plan selection model 116 based on the calculated estimates.

As shown in FIG. 1, the parametric query optimization system 104 includes an execution engine 120. In one or more embodiments herein, the execution engine 120 may receive a parametric query and an identified execution plan and process the parametric query in accordance with the instructions or information included within the identified execution plan. The execution engine 120 may then generate an output responsive to the query, which may include any number of values depending on the nature of the query.

In one or more embodiments, the execution engine 120 may track a cost associated with executing the parametric query. For example, execution engine 120 may track an amount of time, a processing cost, a number of operations, or any other actions indicative of an execution cost that the execution engine 120 had to perform in generating one or more outputs responsive to the parametric query. In many cases, the execution cost may differ significantly from an estimated cost determined by the query optimizer. As will be discussed in further detail below, the plan selection model 116 may be trained to identify an execution plan from the plan cache 112 based on a predicted cost, which may refer to a combination of one or both of the estimated costs from a query log and execution costs tracked by the execution engine 120.

As shown in FIG. 1, the parametric query optimization system 104 additionally includes a data storage 122 having a variety of data and information stored thereon. As shown in FIG. 1, the data storage 122 may include log data 124. The log data 124 may refer to any data from a query log indicating a history of parametric queries and corresponding costs associated therewith. For example, the log data 124 may refer to any information for any number of query instances including, by way of example, combinations of predicates for a given parametric query, characteristics of a parametric query template, estimates costs, execution costs, and any other information that may be used by any of the components 108-120 of the parametric query optimization system 104 in performing features and functionalities described herein.

As further shown, the data storage 122 may include plan data 126. The plan data 126 may refer to any information associated with the execution plans 114 of the plan cache 112. For example, the plan data 126 may refer to the execution plans themselves and any instructions, operators, or information contained therein. The plan data 126 may include information associated with how the plans were selected, a frequency with which the various execution plans 114 have been used, or any other information that may be used in updating the plan cache 112 or simply selecting the execution plans 114 in connection with the plan selection model(s) 116.

As further shown, the data storage 122 may include model data 128. The model data 128 may include any information associated with the plan selection model 116. For example, the model data 128 may include information about the model itself or any of the data used in training the plan selection model 116. Where the parametric query optimization system 104 manages a plurality of plan selection models for each of multiple parametric query templates, the model data 128 may include relevant information for each of the respective plan selection models that may be used by any of the components 108-120 of the parametric query optimization system 104 in identifying an execution plan from the plan cache 112 having the lowest predicted execution cost.

Figure 2:
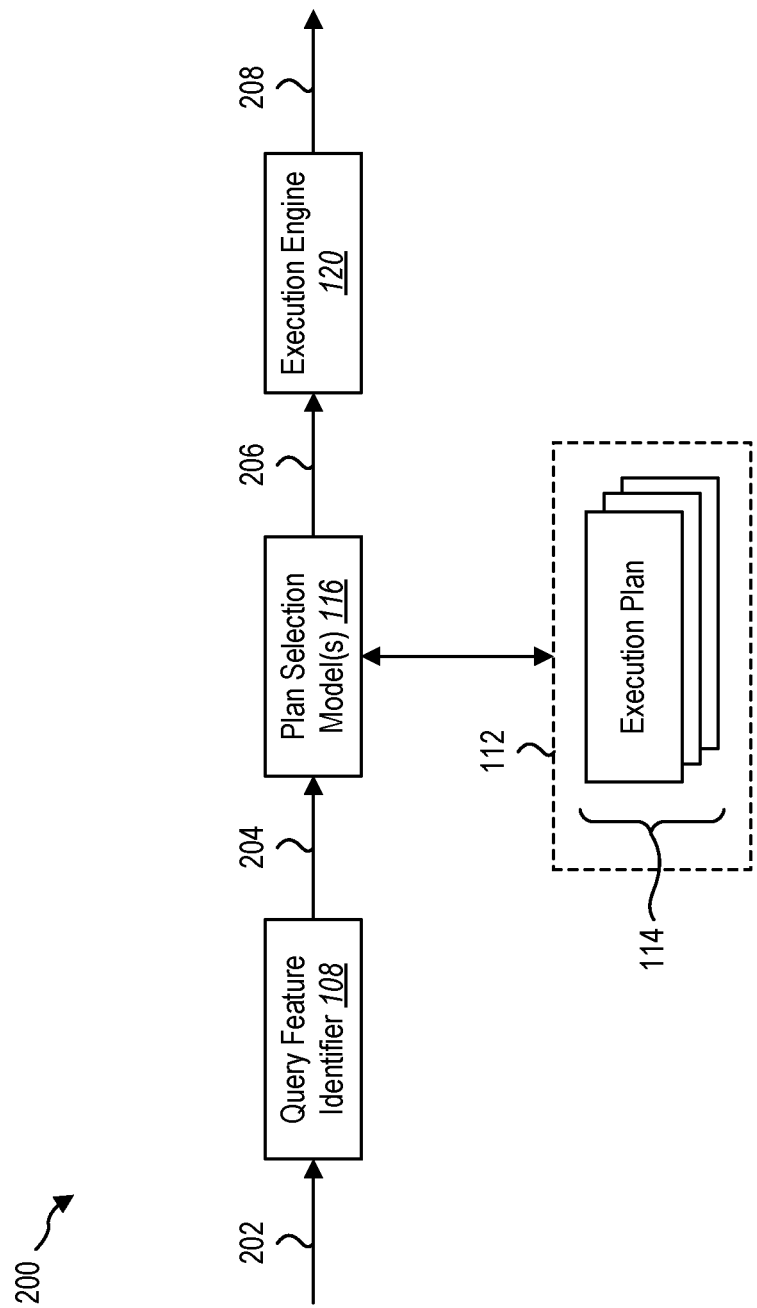
FIG. 2 illustrates an example workflow for implementing a plan selection model trained to identify an execution plan and process a query in accordance with identified execution plan.

Additional information in connection with an example implementation will now be discussed in connection with FIG. 2. For example, FIG. 2 illustrates an example workflow 200 showing implementation of a plan selection model 116 that has been trained to identify cached execution plans for parametric queries associated with a parametric query template. A similar workflow 200 may be implemented using a different plan selection model 116 for each of multiple parametric query templates.

As shown in FIG. 2, a query feature identifier 108 may receive an input query 202. The input query 202 may refer to a parametric query including a plurality of predicates based on values provided to fields of a parametric query template by a user of a client device. In one or more embodiments, the input query 202 refers to a file or object including the entire input query including the query statement(s) and associated predicate values. Other implementations may involve the query feature identifier 108 simply receiving a plurality of predicates based on values entered within respective fields of the parametric query template presented on an application (e.g., a web application) of a client device.

As shown in FIG. 2, the query feature identifier 108 may identify a plurality of query features 204 for the input query 202 to provide as inputs to the plan selection model 116. As noted above, the query feature identifier 108 may generate a wide variety of query features based on characteristics of the query and/or predicates. In one or more embodiments, the query feature identifier 108 generates a plurality of selectivities for a corresponding plurality of predicates. For example, in one or more embodiments, the query feature identifier 108 generates a selectivity for each of the predicates included within the input query 202.

Upon receiving the query features (e.g., the selectivities), the plan selection model 116 may evaluate a plan cache 112 including a plurality of execution plans 114 that have been pre-selected for the parametric query template. In this example, the plan selection model 116 may evaluate the received query features 204 to predict which of the plurality of execution plans 114 would result in a lower execution cost than the other execution plans from the plan cache 112. Upon predicting the execution plan associated with the lowest cost, the plan selection model 116 may provide the selected execution plan 206 to the execution engine 120 for further processing.

While not shown in FIG. 2, the execution engine 120 may receive the execution plan 206 and any information associated with the input query 202 that enables the execution engine 120 to carry out the execution plan 206. In particular, the execution engine 120 may perform any number of operations indicated in the parametric query on dataset(s) of a relational database to generate an output 208 that is responsive to the input query 202. This output 208 may include a filtered dataset, an aggregation of dataset values, or any data that is generated from the relational database based on the input query 202.

As indicated above, the execution engine 120 may track an execution cost associated with executing the query in accordance with the received execution plan 206. This may involve tracking a number of operations performed on a relational database. This may refer to a processing cost of the execution engine 120 itself. This may refer to a time that was required in generating the output 208. In one or more embodiments, the execution cost may be a combination of some of the above signals. As will be discussed below, the tracked execution cost may be used in further training or fine-tuning one or more algorithms employed by the plan selection model 116.

In one or more embodiments, the plan selection model 116 employs a minimization problem to identify the execution plan predicted to have a lowest execution cost relative to other execution plans from the plan cache 112. For example, given a workload (W) having query instances (q) for a parameterized query (Q) and a set of K cached plans $\mathcal{P} = \{P_1, P_2 \ldots P_K\}$, the plan selection model 116 can learn a method that minimizes optimizer estimated cost or execution cost for a query instance using one of the following objectives (SO):

$$SO_{OptimizationCost}(P', q_e) = \frac{\text{Cost}(P', q_e)}{\text{argmin}_{P \in \mathcal{P}} \text{Cost}(P, q_e)}$$

$$SO_{ExecutionCost}(P', q_e) = \frac{\text{ExecCost}(P', q_e)}{\text{argmin}_{P \in \mathcal{P}} \text{ExecCost}(P, q_e)}$$

Figure 3:
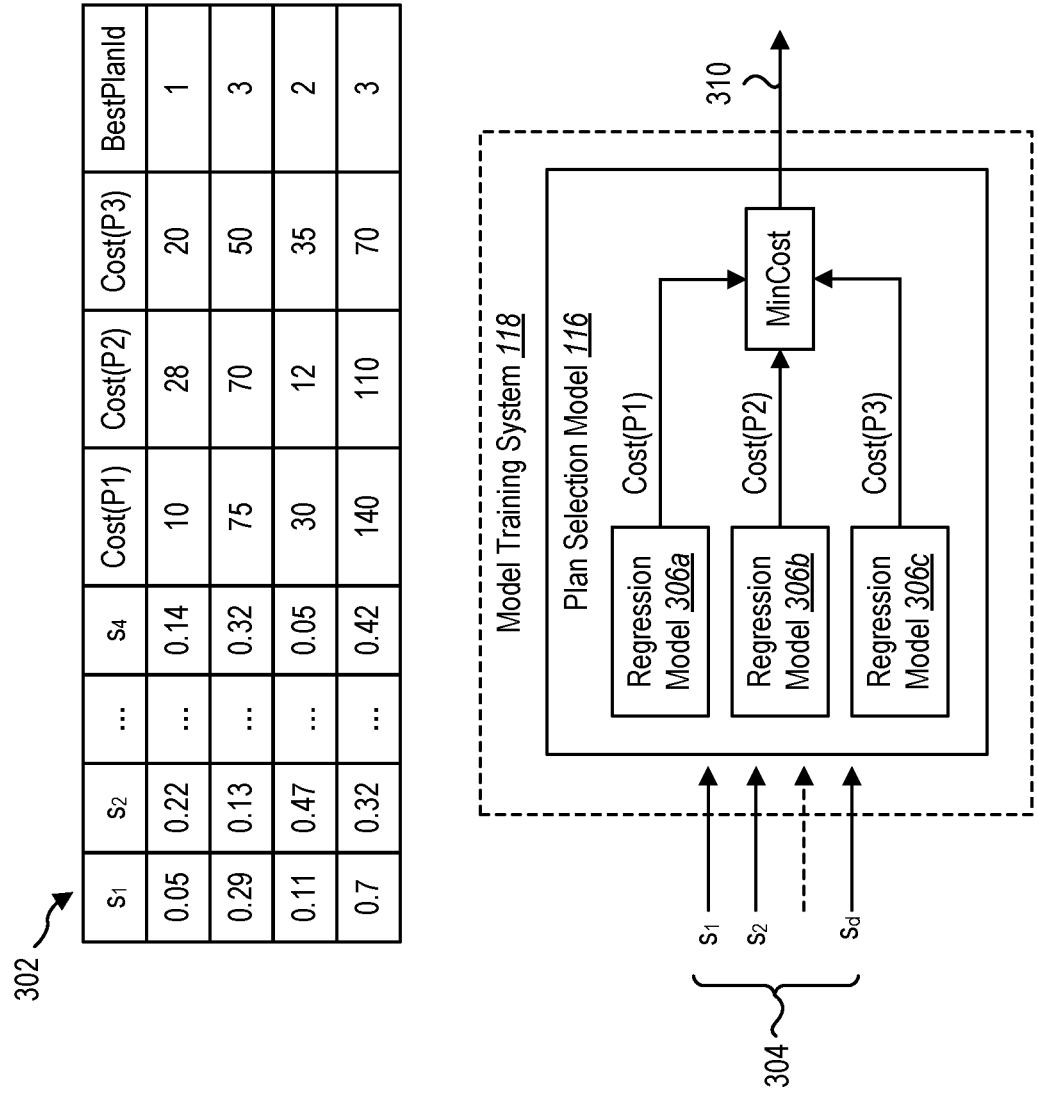
FIG. 3 illustrates an example implementation for training a plan selection model to identify an execution plan from a cache of pre-selected execution plans in accordance with one or more embodiments.

FIG. 3 illustrates an example implementation showing the model training system 118 training the plan selection model 116 to predict a best plan from a plurality of pre-selected plans. In particular, FIG. 3 illustrates an example query log 302 showing data in connection with parametric queries that may be used in training the plan selection model 116. The query log 302 may include any number of parametric queries and associated costs for each of the cached execution plans that have been determined (e.g., by a query optimizer) in connection with the various combinations of predicates that make up the respective parametric queries.

More specifically, the query log 302 shows query features (e.g., predicate selectivities) that have been determined for each of a plurality of parametric queries. In this example, the query log 302 includes selectivities for a plurality of predicates (e.g., selectivities $s_1, s_2, \ldots s_n$). As shown in FIG. 3, each of the selectivities may include values ranging from 0 to 1 indicating a percentage of rows within a dataset or database that satisfy an associated predicate. In the example shown in FIG. 3, each row of the query log 302 may refer to a set of predicates for a corresponding parametric query.

As shown in FIG. 3, the plan selection model 116 may receive sets of selectivities 304 (e.g., selectivities $s_1$-$s_d$) for any number of predicates and run a series of analyses on the selectivities to determine which of a plurality of execution plans would result in the lowest execution cost. Other query features may also be provided as inputs to the plan selection model 116. In this example, the plan selection model 116 refers to a regression-type model that makes use of a plurality of regression models 306*a*-*c* associated with determining an estimated cost for each of a corresponding number of execution plans. Alternatively, as will be discussed in further detail below, one or more embodiments of the plan selection model 116 may refer to a classification model that would be trained to determine a best plan identifier without requiring the plan cost values.

In the example shown in FIG. 2, a first regression model 306*a* may be used to determine a first cost (Cost (P1)) associated with executing a parametric query having the set of selectivities 304 using a first execution plan. Similarly, a second regression model 306*b* may be used to determine a second cost (Cost (P2)) associated with executing the parametric query having the set of selectivities 304 using a second execution plan. A third regression model 306*c* may be used to determine a third cost (Cost (P3)) associated with executing the parametric query having the set of selectivities 304 using a third execution plan. Other implementations may estimate any number of costs associated with a corresponding number of execution plans that make up a plan cache.

As shown in FIG. 3, the plan selection model 116 may provide the costs for each of the regression models 306*a*-*c* to a mincost model 308 configured to determine which of the costs output by the regression models 306*a*-*c* is the lowest and representative of the lowest estimated execution cost. In this example, the mincost model 308 may simply identify a minimum value output from the plurality of regression models 306*a*-*c* to identify a lowest cost execution plan. As shown in FIG. 3, the plan selection model 116 may generate an output 310 indicating which of the execution plans would be the "best" based on the estimated costs.

As shown in FIG. 3, the query log 302 shows each of the associated costs (P1-P3) associated with the corresponding execution plans. For example, in connection with a first parametric query, the query log 302 shows a first cost (P1) of 10, a second cost (P2) of 28, and a third cost (P3) of 20. Based on these estimated values, the plan selection model 116 may output a best plan identifier (ID) of "1" indicating a first execution plan of a set of three possible execution plans represents the lowest estimated execution cost. As shown in FIG. 3, the query log 302 shows associated costs and a best plan identifier for each of the additional parametric queries.

While the example query log 302 shown in FIG. 3 shows a best plan classification for four sample parametric queries (or four combinations of selectivities associated with corresponding parametric queries), it will be appreciated that the plan selection model 116 may be trained using any number of sets of query features (e.g., selectivities) associated with a corresponding parametric query template. Accordingly, in one or more embodiments, the query log 302 may include hundreds or thousands of rows associated with parametric queries for which associated costs and best plan identifiers are known.

In accordance with one or more embodiments, the plan selection model 116 may be trained to imitate or otherwise replicate the results of the query log 302 based on the various combinations of selectivities. For example, the plan selection model 116 may observe and learn trends associated with various combinations of selectivities to determine which of a plurality of execution plans are typically selected for similar combinations of selectivities. Moreover, because the plan selection model 116 includes one or more machine learning models, the plan selection model 116 may be trained to recognize trends of other types of query features including the selectivities and other query characteristics.

In one or more embodiments, the plan selection model 116 may determine that one or more of the selectivities are more determinative of the best execution plan in various instances. For example, the plan selection model 116 may determine that where a first selectivity is very low (e.g., between 0 and 0.1), a first execution plan is nearly always selected no matter the values of the other selectivities. As another example, the plan selection model 116 may determine that a first and second selectivity contribute to determination of the best execution plan with additional selectivities having almost no influence whatsoever.

In these examples, the plan selection model 116 may determine that one or more of the selectivities should be weighted more than other selectivities in determining a best execution plan. In one or more embodiments, the plan selection model 116 may determine that a subset of the predicates and associated query features should be considered while other predicates and associated query features should be discounted or even discarded from consideration. Accordingly, in one or more embodiments, the plan selection model 116 may be trained to identify a given execution plan based on a subset of query features from a corresponding set of query features for one or more parametric query templates.

FIG. 3 illustrates an example in which the plan selection model 116 is trained to identify the "best" execution plan based on a low-execution cost criteria. In one or more embodiments, the plan selection model 116 is trained to view selection of the execution plan as a multi-class classification problem where K-plans (e.g., K-number of plans) correspond to K-classes. In this example, the plan selection model 116 learns to partition the features within a feature space based on the best plan identifier labels. Accordingly, in this example, the training data includes a set of query instances that are labeled with an identifier of the best among the K-plans.

As an alternative to training the plan selection model 116 using a multi-class classification problem approach, the plan selection model 116 may be trained using regression models (e.g., as shown in FIG. 3). In this example, the plan selection model 116 may be trained using individual regression models for each of the execution plans that are configured to determine an estimated cost given the input features (e.g., selectivities) for incoming query instances. This example is similar to the implementation shown in FIG. 3 in which the model training system 118 employs a regression model for each of the execution plans that provide an estimated cost associated with executing a query instance using each of the corresponding execution plans.

As noted above, in one or more embodiments, the plan selection model 116 may be trained to select a best predicted execution plan based on a combination of selectivity values (or other query feature values). Where the query features can have numeric values, this may involve determining a best execution plan based on a determined placement of the combination of query feature values on a multi-dimensional feature map (e.g., a multi-dimensional feature space). As will be discussed in further detail below, the multi-dimensional feature map may include any number of dimensions based on a number of predicates that may be included within instances of parametric queries for a parametric query template. Alternatively, in accordance with one or more embodiments described above, the multi-dimensional feature map may include a number of dimensions based on a number of a subset of predicates that are more determinative in selection of a corresponding execution plan.

In one or more embodiments, the plan selection model 116 can be trained to identify an execution plan based on a selective consideration of a subset of query features. For example, because complexity of mapping regions grows significantly (exponentially) with each additional dimension of the feature map, determining that a fewer number of query features are strongly correlated with predicting the lowest cost execution plan can reduce processing expense of implementing the plan selection model 116. Indeed, by discounting or simply discarding one or more query features that have little to no correlation with selection of an execution plan, the plan selection model 116 may reduce a processing cost and selection speed associated with identifying the execution plan from the pre-selected cache of execution plans.

For ease in explanation, a two-dimensional feature map will be discussed in connection with FIGS. 4A-4B. In particular, as will be discussed in connection with FIGS. 4A-4B, a plan selection model 116 may be trained to select a best execution plan from a plan cache having four pre-selected execution plans. As will be discussed below, the feature map may include two dimensions corresponding to two selectivities ($s_1$, $s_2$) associated with two predicates that may be received in connection with a parametric query template. While this simple implementation is provided as an illustrative example, other implementations may have any number of query features that the plan selection model 116 is trained to consider resulting in a multi-dimensional feature map having any number of dimensions. Nevertheless, similar features and functionalities discussed in connection with the two-dimensional feature map shown in FIGS. 4A-4B may apply to more complex parametric templates having a larger number of predicates associated with a larger number of selectivities and other query features.

Figure 4A:
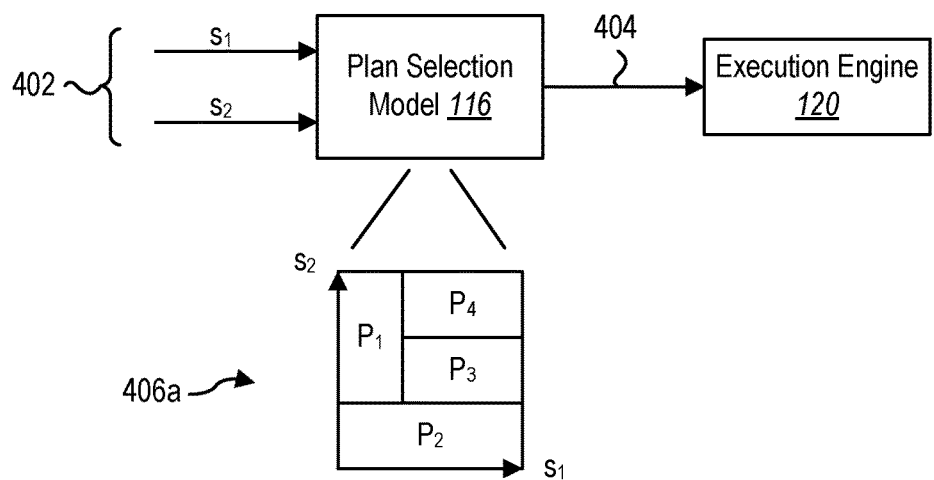
FIGS. 4A-4B illustrate an example implementation for training and refining a plan selection model to identify an execution plan from a cache of pre-selected execution plans in accordance with one or more embodiments.

As shown in FIG. 4A, the plan selection model 116 may receive a set of selectivities 402 that may be used to identify an execution plan in accordance with training that has been performed on the plan selection model 116 (e.g., as discussed above in connection with FIG. 3). In this example, the plan selection model 116 may have learned a feature map 406a including regions of the two-dimensional space corresponding to different execution plans (P1-P4). While conventional systems may implement a feature map based on a static or fixed algorithm (e.g., where a single plan is used for all query instances in a feature space or where boundaries of the map are user-defined), this feature map 406a may be generated based on estimated costs for a plurality of query instances from a query log and associated best plan identifiers that have been previously analyzed and incorporated into the training of the plan selection model 116. For example, the learned regions may partition the feature space, such as mapping each point of the feature space to a cached execution plan (e.g., rather than invoking an expensive optimizer call).

As shown in FIG. 4A, the learned feature map 406a may include discrete regions associated with corresponding execution plans from a plurality of pre-selected execution plans. As indicated in FIG. 4A, the learned feature map 406a may indicate that anytime a second selectivity ($s_2$) is below a first threshold value, a second execution plan (P2) will be selected independent of a value of the first selectivity ($s_1$). Alternatively, where the first selectivity is below another threshold value and where the second selectivity is above the first threshold value, a first execution plan (P1) will be selected. Other regions associated with different selectivity values may correspond to selection of the third execution plan (P3) and the fourth execution plan (P4).

It will be noted that this first feature map 406a shown in FIG. 4A may be based in whole or in part on estimated values generated by a query optimizer that has been trained or otherwise configured to determine estimated costs for execution of a query based on a corresponding execution plan. Accordingly, in one or more embodiments, this feature map 406a may be representative of a training process of the plan selection model 116 independent of actual execution costs tracked by the execution engine 120 over some period of time in which execution plans are selected and executed in accordance with one or more embodiments described herein.

Accordingly, as shown in FIG. 4A, the plan selection model 116 may be trained to identify an execution plan having a lowest cost relative to other execution plans from a plan cache by learning a feature map 406a. In this way, the plan selection model 116 may not necessarily employ robust analysis of every incoming parametric query, but rather simply identify a region of the feature map 406a that a combination of selectivities falls within and identify the execution plan accordingly.

While FIG. 4A illustrates an example in which the feature map 406a has four regions that are relatively uniform in size and have minimal complexity, it will be appreciated that due to training and refining of the plan selection model 116 based on data from a query log, these regions of the feature map 406a may have abnormal sizes and shapes based on concentrations of query features that will likely happen in received instances of the parametric queries. For example, a workload associated with processing parametric queries for a particular parametric query template may result in a high concentration of query instances in which query features of those query instances would be mapped within a relatively small region as other instances of parametric queries. In these cases, using machine-learning to train the plan selection model 116 provides additional benefit over a more conventional static algorithm in which various execution plans are assigned to regions having more simple or uniform ranges, such as an example where a set of execution plans would be assigned to uniform ranges of selectivities (e.g., 0 to 0.1, 0.1 to 0.2, 0.2 to 0.3, etc.). Indeed, in contrast to more static algorithms, the plan selection model 116 provides a feature map in which the regions are more closely tailored to an actual workload of the parametric query optimization system 104.

As noted above, and as shown in FIG. 4B, the plan selection model 116 may be refined over time to modify the feature map and ultimately change how execution plans may be determined over time. In one or more embodiments, this may involve receiving new training data based on observed inaccuracies between earlier iterations of the feature map (e.g., based on optimizer estimated costs) and feedback including observed execution costs of the execution plans. Other implementations may involve updating the feature map based on modifications to the execution plans or addition of new execution plans, or any other modification to the workflow involved in populating a plan cache and/or selecting an execution plan from the plan cache.

It will be noted that the process of populating the plan cache and identifying the execution plan from the cache plan may be decoupled in accordance with one or more embodiments described herein. This enables the plan selection model 116 to use machine learning by exploiting query logs for training. It also provides flexibility in identifying plans in scenarios in which the cached plans are optimized and represent a good selection of plans for a given parametric query as well as scenarios in the cached plans are poorly optimized and do not represent a great selection on plans for the parametric query. Accordingly, the plan selection model 116 may accurately identify the best available plan independent of the quality with which the plan cache has been populated.

In one or more embodiments, the plan selection model 116 may receive execution data indicating actual execution costs associated with executing the instances of the parametric query. For example, as shown in FIG. 4B, the plan selection model 116 may provide an identified execution plan 404 to the execution engine 120. The execution engine 120 may use the identified execution plan 404 to execute the parametric query having predicates associated with the input selectivities 402. As discussed above, the execution engine 120 may generate an output responsive to the parametric query.

Figure 4B:
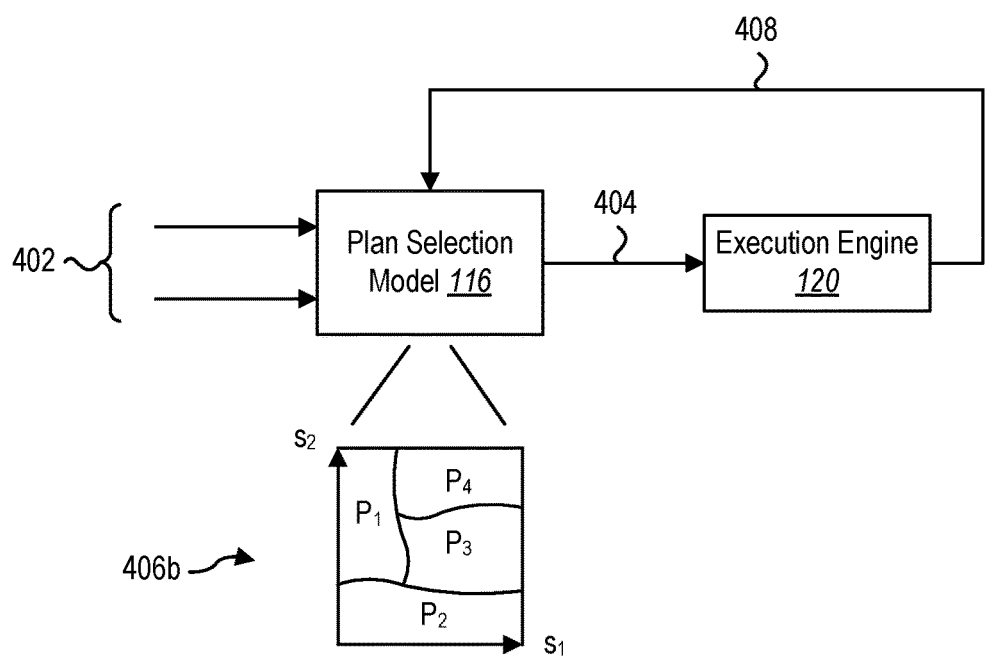

As further shown in FIG. 4B, the execution engine 120 may track an execution cost and provide an indication of the execution cost 408 as feedback to the plan selection model 116. In one or more embodiments, the plan selection model 116 may receive the indication of the execution cost 408 and compare the actual execution cost to a predicted cost that was previously based on estimated costs determined by a query optimizer. In this way, the plan selection model 116 may refine the models therein based on additional information including the execution cost, which may be different from an estimated cost.

As shown in FIG. 4B, the plan selection model 116 may refine selection of execution plans by learning a modified feature map 406b having regions that differ from the previous version of the feature map 406a shown in FIG. 4A. As shown in FIG. 4B, the plan selection model 116 may learn the modified feature map 406b based on observed differences between the training data, which may include estimated costs as calculated by a query optimizer and execution costs as tracked by the execution engine 120. The plan selection model 116 may fine-tune various algorithms and models in accordance with any number of training mechanisms.

In addition to simply retraining the plan selection model 116 based on observed differences between training data and execution data, the plan selection model 116 may additionally employ a number of retraining methods and sampling mechanisms to determine inaccuracies and ultimately refine how the plan selection model 116 is trained to identify execution plans over time. For example, as will be discussed in further detail below in connection with FIG. 5, the plan selection model 116 may be fine-tuned or otherwise retrained over time using random selection and/or using bandit-mitigated selection methods.

For example, in one or more embodiments described herein, the parametric query optimization system 104 makes us of a bandit learner that utilizes execution cost after query instances have been executed. For example, in one or more embodiments, the parametric query optimization system 104 can formulate predicted costs as a contextual multi-arm bandit problem. In each iteration, the parametric query optimization system 104 can (1) process input (e.g., a context) by taking an action that involves selecting one out of a fixed set of candidates (e.g., arms), (2) observe a reward generated for that action, and (3) use the reward to influence the future actions for similar contexts. This technique need not take optimal actions for initial inputs, nor do suboptimal actions need to be explicitly corrected. Rather, this approach focuses on a balance between exploration of new choices and exploitation of knowledge already gained.

In one or more embodiments, a selectivity vector of an incoming query can be considered as an input/context, selecting one of a fixed set of cached plans being viewed as an action and execution cost being considered a reward that is used to train the plan selection model 116 for future instances. As more instances are processed, the bandit technique can be expected to select plans with lower execution cost from the cache.

In one or more embodiments, the parametric query optimization system 104 utilizes contextual bandits using Thompson sampling. For example, in one or more implementations, Thompson sampling is employed using the following algorithm:

```
1:   for each query instance q_i with context (selectivity) V^i do
2:      //getPlan
3:      for plan j in 1 to K do
4:         Select model s uniformly at random from [1,t]
5:         set r̂_j = f̂_{j,s} (V^i)
6:      end for
7:      Select action a = arg min_j r̂_j
8:      Obtain true reward (execution cost) r_a^i
9:      //adapt getPlan using execution cost reward
10:     add observation {V^i, r_a^i } to the history of plan P_a
11:     for model s in 1 to t do
12:        Sample observation weight w = Gamma(1,1)
13:        update f̂_{a,s} with new observation {V^i, r_a^i} with weight w
14:     end for
15:  end for
```

Figure 5:
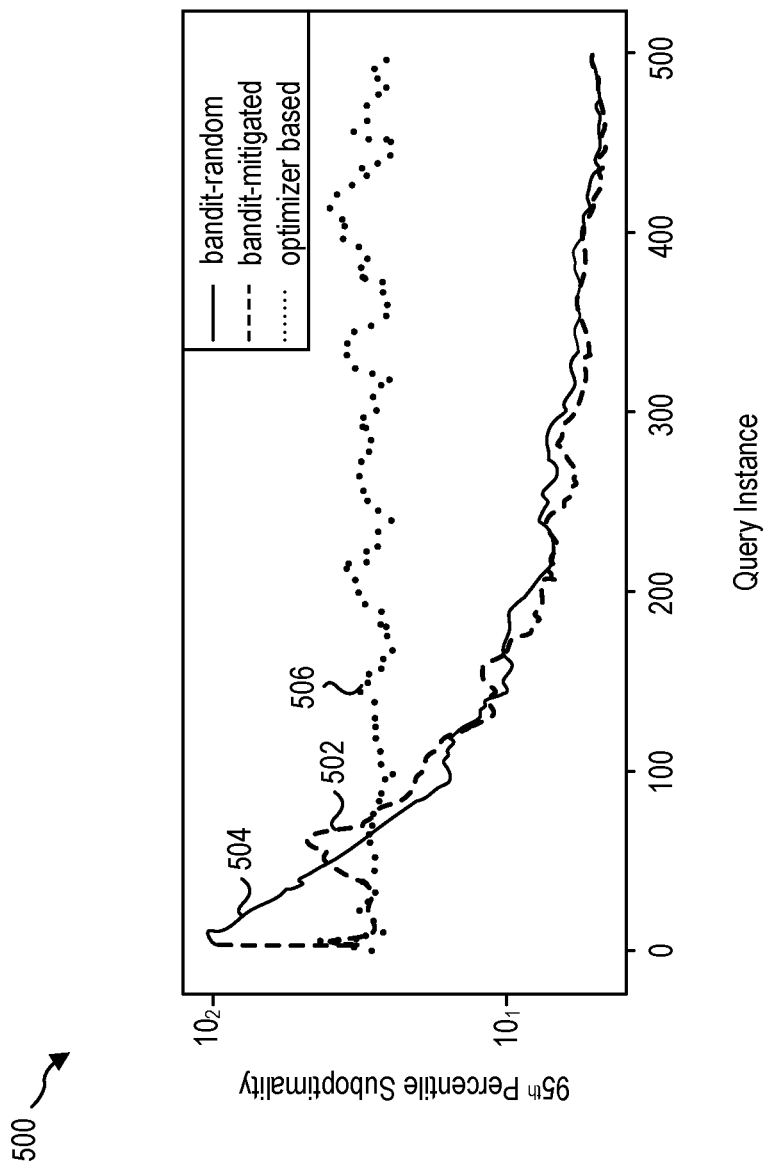
FIG. 5 illustrates example optimization results of the parametric query optimization system relative to additional optimization techniques in accordance with one or more embodiments.

FIG. 5 illustrates an example chart 500 showing accuracy of a plan selection model 116 being trained on sampled query instances over time using a variety of sampling methods. An optimizer-based graph 506 shows an accuracy metric (95$^{th}$ Percentile Suboptimality) over time based solely on optimizer-based estimation of execution plans. As shown in FIG. 5, this optimizer-based graph 506 shows negligible improvement over time as the plan selection model 116 would not be tuned or refined as the query optimizer would be configured to estimate execution costs based on the same criteria and instructions over the query instances.

A bandit-random graph 504 shows accuracy of the plan selection model 116 in selecting an execution plan using a bandit-random sampling mechanism. In this example, random sampling may be used resulting in early inaccuracies, but improving in accuracy over the query instances. As shown in FIG. 5, the bandit-random graph 504 is less accurate than the optimizer-based graph 506 for a first quantity of query instances, but becomes more accurate over time as additional query instances are considered in fine-tuning the plan selection model 116.

A bandit-mitigated graph 502 shows accuracy of the plan selection model 116 in selecting an execution plan using a bandit-mitigated sampling mechanism. In this example, some measure of random sampling is performed resulting in some earlier inaccuracies, but not to the same degree as the bandit-random graph 504. In addition, as shown in FIG. 5, the bandit-mitigated graph 502 becomes more accurate over time similar to the bandit-random graph 504. While accuracy of the bandit-random graph 504 and bandit-mitigated graph 502 both improve over time, the bandit-mitigated graph 502 is more accurate when the plan selection model 116 is initially implemented (relative to the bandit-random graph 504) while also benefiting from improved accuracy over time.

Figure 6:
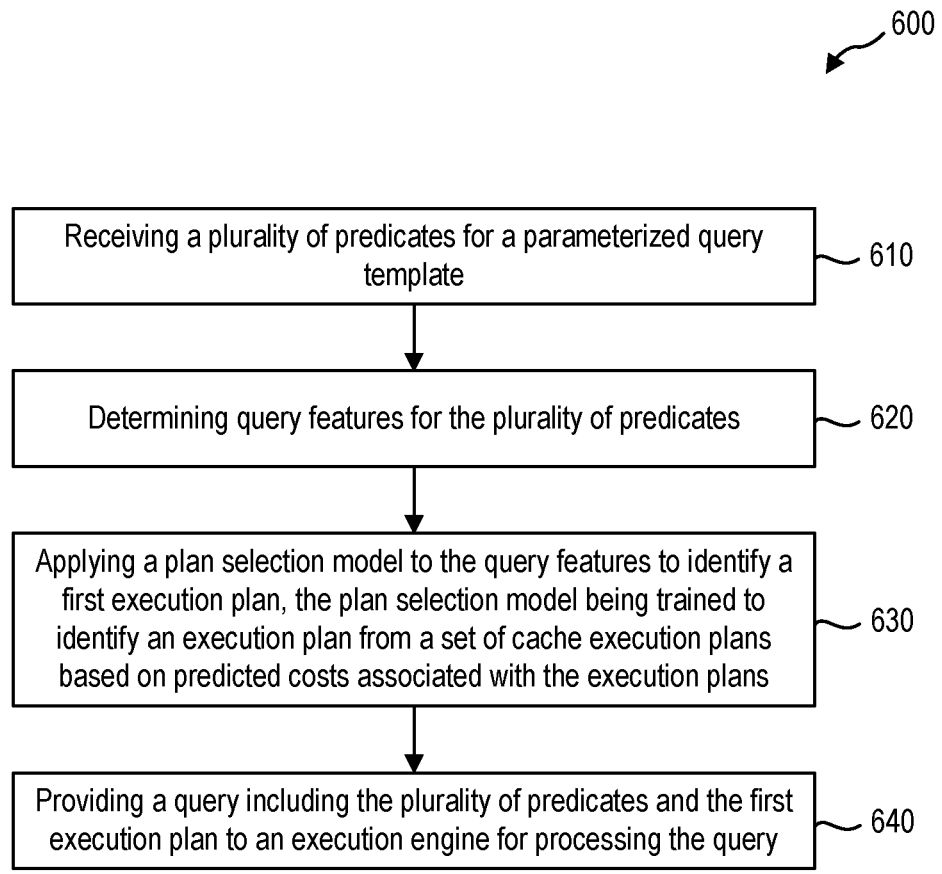
FIG. 6 illustrates a series of acts related to using a plan selection model to identify an execution plan from a set of cached execution plans in accordance with one or more embodiments.

Turning now to FIG. 6, this figure illustrates an example flowchart including a series of acts for training and implementing a plan selection model for selection of a lowest cost execution plan from a set of pre-selected execution plans for processing a parametric query. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 illustrates a series of acts 600 related to training and implementing a plan selection model for selecting an execution plan from a set of pre-selected execution plans that have been cached for a parametric query template. As shown in FIG. 6, the series of acts 600 may include an act 610 of receiving a plurality of predicates for a parametric query.

As further shown, the series of acts 600 may include an act 620 of determining query features for the plurality of predicates. For example, in one or more embodiments, the act 620 may involve determining a plurality of query features for the parametric query based on the plurality of predicates. In one or more embodiments, the plurality of query features includes a plurality of selectivities for the plurality of predicates indicating likelihoods that rows from a relational database satisfy the corresponding predicates. In one or more embodiments, determining the plurality of query features includes determining, for each of multiple predicates from the plurality of predicates, a selectivity indicating a percentage of rows from one or more datasets of the relational database that satisfies a given predicate. In one or more embodiments, the plan selection model is trained to identify the given execution plan based on a subset of query features from the corresponding set of query features.

As further shown, the series of acts 600 may include an act 630 of applying a plan selection model to the query features to identify a first execution plan, the plan selection model being trained to identify an execution plan from a set of cached execution plans based on predicted costs associated with the execution plans. For example, in one or more embodiments, the act 630 involves applying a plan selection model to the plurality of query features to identify a first execution plan from a set of cached execution plans pre-selected for the parametric query where the plan selection model is trained to identify a given execution plan from the set of cached execution plans based on a predicted cost of executing a given query having a corresponding set of query features.

As further shown, the series of acts 600 may include an act 640 of providing a query including the plurality of predicates and the first execution plan to an execution engine for processing the query. For example, in one or more embodiments, the act 640 involves causing the parametric query to be processed by an execution engine in accordance with the first execution plan.

In one or more embodiments, the series of acts 600 includes training the plan selection model to identify the given execution plan from the set of cached execution plans. In one or more embodiments, training the plan selection model includes identifying a set of query logs. The set of query logs may include a set of training queries having corresponding sets of predicates and estimated costs associated with executing the set of training queries using one or more of the cached execution plans where the estimated costs are determined by a query optimizer configured to estimate costs associated with executing a query in accordance with an execution plan. Training the plan selection model may also include training one or more machine learning models to identify the given execution plan based on the set of training queries and the estimated costs.

In one or more embodiments, training the one or more machine learning models includes causing the one or more machine learning models to learn a feature map based on the set of training queries and the estimated costs, the feature map including multi-dimensional regions of the feature map that associate the set of cached execution plans with combinations of query features. In one or more embodiments, applying the plan selection model to the plurality of query features to identify the first execution plan includes determining that a combination of the plurality of query features is mapped to a first multi-dimensional region of the feature map associated with the first execution plan.

In one or more embodiments, the series of acts 600 further includes tracking an execution cost associated with processing the parametric query in accordance with the first execution plan. The series of acts 600 may also include refining the training of the one or more machine learning models to identify the given execution plan based further on the tracked execution cost associated with processing the parametric query in accordance with the first execution plan.

In one or more embodiments, training the one or more machine learning models includes causing the one or more machine learning models to learn a feature map based on the set of training queries and the identification of estimated costs, the feature map including multi-dimensional regions associated with corresponding combinations of query features. Further, in one or more embodiments, refining the training of the one or more machine learning models includes refining boundaries of the multi-dimensional regions of the feature map associated with respective execution plans based on a combination of the set of training queries, the associated identification of estimated costs, and the tracked execution cost associated with processing the parametric query in accordance with the first execution plan. In one or more embodiments, these machine learning models refer to different model-types. For example, the machine learning model(s) may refer to supervised models while the refined machine learning model(s) may refer to a class of contextual multi-arm bandit models.

Figure 7:
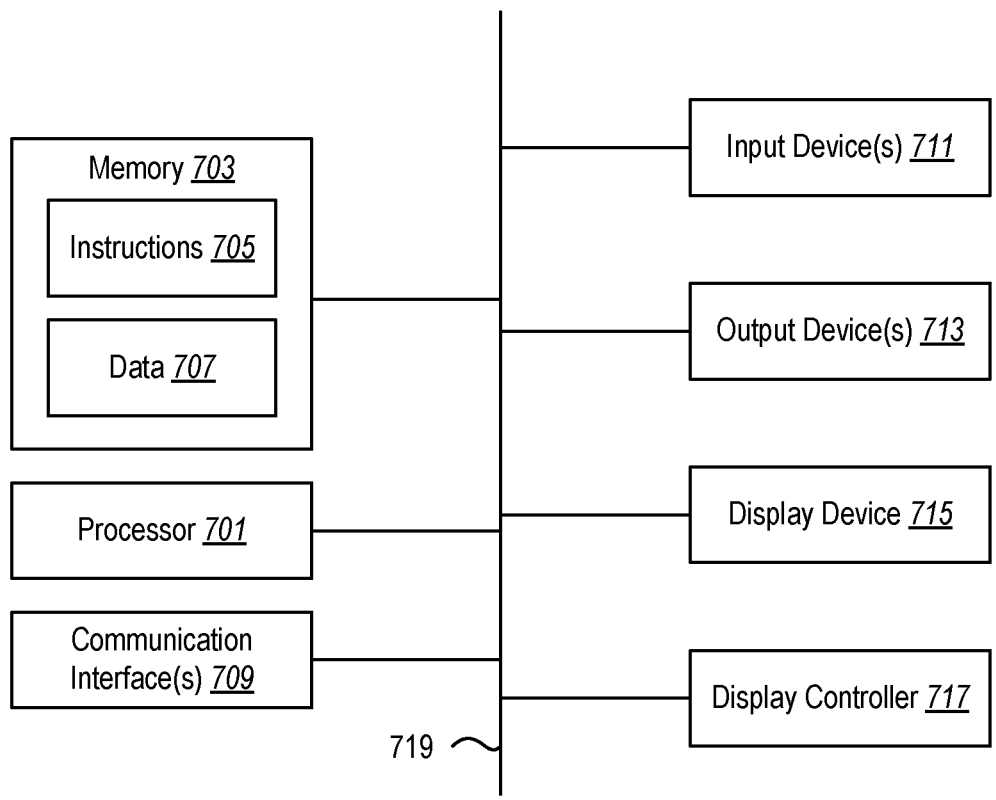
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a plurality of predicates for a parametric query;
   determining a plurality of query features for the parametric query based on the plurality of predicates, the plurality of query features indicating likelihoods that rows from one or more datasets of a relational database satisfies one or more predicates of the plurality of predicates;
   maintaining a cache of execution plans, the cache of execution plans including a plurality of execution plans that have been pre-selected for a type of query associated with the parametric query;
   applying a plan selection model to the plurality of query features to identify a first execution plan from the cache execution plans, the plan selection model being trained to identify a given execution plan from the plurality of execution plans pre-selected for the type of query based on a predicted cost of executing a given query having a corresponding set of query features; and
   causing the parametric query to be processed by an execution engine in accordance with the first execution plan.

2. The method of claim 1, wherein the plurality of query features includes a plurality of selectivities for the plurality of predicates, the plurality of selectivities indicating percentages of rows from the one or more datasets of the relational database that satisfy the corresponding predicates.

3. The method of claim 1, wherein the plan selection model is trained to identify the given execution plan based on a subset of query features from the corresponding set of query features, the subset of query features being associated with a threshold correlation with the predicted cost of executing the given query having the corresponding set of query features.

4. The method of claim 1, further comprising training the plan selection model to identify the given execution plan from the set of cached execution plans, wherein training the plan selection model includes:
   identifying a set of query logs, the set of query logs including:
      a set of training queries having corresponding sets of predicates; and
      estimated costs associated with executing the set of training queries using one or more of the cached execution plans, the estimated costs being determined by a query optimizer configured to estimate costs associated with executing a query in accordance with an execution plan; and
   training one or more machine learning models to identify the given execution plan based on the set of training queries and the estimated costs.

5. The method of claim 4, wherein training the one or more machine learning models includes causing the one or more machine learning models to learn a feature map based on the set of training queries and the estimated costs, the feature map including multi-dimensional regions of the feature map that associate the set of cached execution plans with combinations of query features, wherein applying the plan selection model to the plurality of query features includes determining that a combination of the plurality of query features is mapped to a first multi-dimensional region of the feature map having been associated with the first execution plan.

6. The method of claim 4, further comprising:
   tracking an execution cost associated with processing the parametric query in accordance with the first execution plan; and
   refining the training of the one or more machine learning models to identify the given execution plan based further on the tracked execution cost associated with processing the parametric query in accordance with the first execution plan.

7. The method of claim 6,
   wherein training the one or more machine learning models includes causing the one or more machine learning models to learn a feature map based on the set of training queries and the estimated costs, the feature map including multi-dimensional regions associated with corresponding combinations of query features, and
   wherein refining the training of the one or more machine learning models includes refining boundaries of the multi-dimensional regions of the feature map associated with respective execution plans based on a combination of the set of training queries, the estimated costs, and the tracked execution cost associated with processing the parametric query in accordance with the first execution plan.

8. The method of claim 1, further comprising associating the cache of execution plans with a plurality of multi-dimensional regions of a multi-dimensional feature space, and wherein applying the plan selection model to the plurality of query features to identify the first execution plan is based on determining that the plurality of query features corresponds to a first multi-dimensional region of the plurality of multi-dimensional region having been associated with the first execution plan.

9. The method of claim 8, wherein the multi-dimensional feature space includes a number of dimensions corresponding to a subset of query features of the plurality of query features, the subset of query features being determined to have a threshold correlation with the predicted cost of executing one or more execution plans from the cache of execution plans.

10. A system, comprising:
one or more processors;
memory in electronic communication with the one or more processors; and
instructions stored in the memory, the instructions being executable by the one or more processors to:
receive a plurality of predicates for a parametric query;
determine a plurality of query features for the parametric query based on the plurality of predicates, the plurality of query features indicating likelihoods that rows from one or more datasets of a relational database satisfies one or more predicates of the plurality of predicates;
maintain a cache of execution plans, the cache of execution plans including a plurality of execution plans that have been pre-selected for a type of query associated with the parametric query;
apply a plan selection model to the plurality of query features to identify a first execution plan from the cache execution plans, the plan selection model being trained to identify a given execution plan from the plurality of execution plans pre-selected for the type of query based on a predicted cost of executing a given query having a corresponding set of query features; and
cause the parametric query to be processed by an execution engine in accordance with the first execution plan.

11. The system of claim 10, wherein the plurality of query features includes a plurality of selectivities for the plurality of predicates, the plurality of selectivities indicating percentages of rows from the one or more datasets of the relational database that satisfy the corresponding predicates.

12. The system of claim 10, wherein the plan selection model is trained to identify the given execution plan based on a subset of query features from the corresponding set of query features, the subset of query features being associated with a threshold correlation with the predicted cost of executing the given query having the corresponding set of query features.

13. The system of claim 10, wherein the instructions are further executable to train the plan selection model to identify the given execution plan from the set of cached execution plans, wherein training the plan selection model includes:
identifying a set of query logs, the set of query logs including:
a set of training queries having corresponding sets of predicates; and
estimated costs associated with executing the set of training queries using one or more of the cached execution plans, the estimated costs being determined by a query optimizer configured to estimate costs associated with executing a query in accordance with an execution plan; and
training one or more machine learning models to identify the given execution plan based on the set of training queries and the estimated costs.

14. The system of claim 13, wherein training the one or more machine learning models includes causing the one or more machine learning models to learn a feature map based on the set of training queries and the estimated costs, the feature map including multi-dimensional regions of the feature map that associate the set of cached execution plans with combinations of query features, wherein applying the plan selection model to the plurality of query features includes determining that a combination of the plurality of query features is mapped to a first multi-dimensional region of the feature map having been associated with the first execution plan.

15. The system of claim 13, wherein the instructions are further executable to:
track an execution cost associated with processing the parametric query in accordance with the first execution plan; and
refine the training of the one or more machine learning models to identify the given execution plan based further on the tracked execution cost associated with processing the parametric query in accordance with the first execution plan.

16. The system of claim 15,
wherein training the one or more machine learning models includes causing the one or more machine learning models to learn a feature map based on the set of training queries and the estimated costs, the feature map including multi-dimensional regions associated with corresponding combinations of query features, and
wherein refining the training of the one or more machine learning models includes refining boundaries of the multi-dimensional regions of the feature map associated with respective execution plans based on a combination of the set of training queries, the estimated costs, and the tracked execution cost associated with processing the parametric query in accordance with the first execution plan.

17. The system of claim 10, the instructions being further executable by the one or more processors to associate the cache of execution plans with a plurality of multi-dimensional regions of a multi-dimensional feature space, and wherein applying the plan selection model to the plurality of query features to identify the first execution plan is based on determining that the plurality of query features corresponds to a first multi-dimensional region of the plurality of multi-dimensional region having been associated with the first execution plan.

18. The system of claim 17, wherein the multi-dimensional feature space includes a number of dimensions corresponding to a subset of query features of the plurality of query features, the subset of query features being determined to have a threshold correlation with the predicted cost of executing one or more execution plans from the cache of execution plans.

19. A non-transitory computer-readable medium storing instructions thereon that, when executed by one or more processors, causes a computing device to:
receive a plurality of predicates for a parametric query;
determine a plurality of query features for the parametric query based on the plurality of predicates, the plurality of query features indicating likelihoods that rows from one or more datasets of a relational database satisfies one or more predicates of the plurality of predicates;
maintain a cache of execution plans, the cache of execution plans including a plurality of execution plans that have been pre-selected for a type of query associated with the parametric query;
apply a plan selection model to the plurality of query features to identify a first execution plan from the cache of execution plans, the plan selection model being trained to identify a given execution plan from the plurality of execution plans pre-selected for the type of query based on a predicted cost of executing a given query having a corresponding set of query features; and cause the parametric query to be processed by an execution engine in accordance with the first execution plan.

20. The non-transitory computer-readable medium of claim 19, wherein the plurality of query features includes a plurality of selectivities for the plurality of predicates, the plurality of selectivities indicating percentages of rows from the one or more datasets of the relational database that satisfy the corresponding predicates.

* * * * *